United States Patent [19]

Sextro et al.

[11] 3,925,505

[45] Dec. 9, 1975

[54] THERMOPLASTIC MOLDING COMPOSITION BASED ON POLY (OXYMETHYLENES)

[75] Inventors: Günter Sextro, Naurod, Taunus; Karlheinz Burg, Langenhain, Taunus, both of Germany

[73] Assignee: Hoechst Aktiengesellschaft, Frankfurt am Main, Germany

[22] Filed: May 3, 1974

[21] Appl. No.: 466,899

Related U.S. Application Data

[63] Continuation of Ser. No. 281,127, Aug. 16, 1972, abandoned.

[52] U.S. Cl............ 260/823; 260/2 BP; 260/2 XA; 260/67 FP
[51] Int. Cl.² ................... C08G 16/06; C08G 4/00
[58] Field of Search .... 260/823, 67 FP, 2 XA, 2 EP

[56] References Cited
UNITED STATES PATENTS

| | | | |
|---|---|---|---|
| 3,072,609 | 1/1963 | Berardinelli et al............ | 260/67 FP |
| 3,631,124 | 12/1971 | Burg et al...................... | 260/823 |
| 3,641,192 | 12/1972 | McAndrew et al............. | 260/823 |

FOREIGN PATENTS OR APPLICATIONS

| | | | |
|---|---|---|---|
| 1,010,072 | 11/1965 | United Kingdom............. | 260/823 |

*Primary Examiner*—Wilbert J. Briggs, Sr.
*Attorney, Agent, or Firm*—Curtis, Morris & Safford

[57] ABSTRACT

A modified thermoplastic molding composition based on polyacetal prepared by polymerizing trioxane in the presence of a polyether by means of a catalyst; the polyether is a copolymer of at least 2 different cyclic ethers. The polymerization may also take place in the presence of additional monomers, suitable for the co-polymerization with trioxane. The molding composition is suitable for the manufacture of different kinds of shaped articles, especially machine parts.

9 Claims, No Drawings

THERMOPLASTIC MOLDING COMPOSITION BASED ON POLY (OXYMETHYLENES)

This is a continuation of application Ser. No. 281,127 filed Aug. 16, 1972, now abandoned.

The present invention relates to a thermoplastic molding composition based on poly(oxymethylenes).

It is known that trioxane, together with polymeric chain transfer agents, can be polymerized by means of cationic catalysts into products of high molecular weight which are disignated as block polymers. As polymeric chain transfer agents there may be used, amongst others polymeric ethers, for example poly(ethylene oxide), poly(propylene oxide) and poly(-vinylsisopropyl ether) (cf. U.S. Pat. No. 3,346,663; V. Jaacks and W. Kern, Makromolekulare Chemie 83 (1965), pages 71 to 78; Belgian Patent 717,224.

These block copolymers containing polyether segments, for example (poly(ethylene oxide), have, however, the disadvantage that due to the hydrophilic nature of poly(ethylene oxide) polyglycol) they are somewhat hygroscropic; this property may considerably disturb their technical processing and use. Furthermore, the poly(ethylene oxide) incorporated in the polymer crystallizes in the course of time at room temperature, so that the articles molded of this polymer get brittle. The same applies to the use of poly(tetrahydrofurane).

It has now been found that poly(oxymethylenes), in which copolymers of certain cyclic ethers are incorporated, provide surprising advantages as compared with the above-mentioned polymers.

An object of the present invention is to provide a thermoplastic molding composition based on poly(oxymethylenes), essentially consisting of a poly(oxymethylene) — possibly containing from 0.1 to 20% by weight of oxyalkylene groups with 2 to 8 adjacent carbon atoms in the principal chain — which contains from 0.1 to 40% by weight of polyether segments with an average molecular weight of at least 500 consisting essentially of at least 2 different structural units of formula (I)

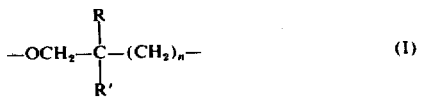

wherein R and R' are the same or different and each represents a phenyl radical or a lower alkyl radical which may be substituted by a halogen atom, a lower alkoxy radical, a phenoxy radical or a nitrile group, or in which R and R' represent hydrogen atoms, and n means zero, 1 or 2.

Another object of the invention is to provide a process for the production of a poly(oxymethylene) containing polyether segments by polymerization of trioxane, possibly together with the compounds known to be copolymerized with trioxane, in the presence of a polyether, by means of a cationic catalyst at a temperature of between 0° and 100°C, which comprises using as polyether a copolymer with an average molecular weight of at least 500 consisting essentially of at least 2 different structural units of formula (I)

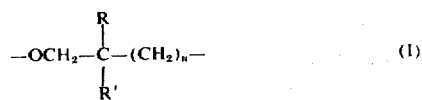

wherein R and R' are the same or different and each represents a phenyl radical or a lower alkyl radical which may be substituted by a halogen atom, a lower alkoxy radical, a phenoxy radical or a nitrile group, or in which R and R' represent hydrogen atoms, and n means zero, 1 or 2.

For the production of the poly(oxymethylenes) of the invention there are used preferably from 99.8 to 80% by weight of trioxane, from 0.1 to 10% by weight of comonomers and from 0.1 to 10% by weight of the above-mentioned polyethers.

Especially good results are obtained with oxymethylene polymers containing from 98.5 to 90% by weight of oxymethylene units, from 1 to 5% by weight of comonomer units and from 0.5 to 5% by weight of polyether units.

As polyethers in the sense of the invention are used copolymers of at least 2 different cyclic ethers with 3 to 5 ring members. Particularly suitable are the binary or ternary copolymers of the compounds of formula (II)

wherein R and R' are the same or different and each represents a phenyl radical or a lower alkyl radical which may be substituted by a halogen atom, preferably a chlorine atom, a lower alkoxy radical, a phenoxy radical or a nitrile group, or in which R and R' represent hydrogen atoms, and n is zero, 1 or 2. (By lower alkyl or lower alkoxy radicals are to be understood radicals containing 1 to 6, preferably 1 to 3 carbon atoms). The binary or ternary copolymers of monomers with different ring sizes are used preferably. As examples of the cyclic ethers in accordance with the present invention there may be mentioned: ethylene oxide, isobutylene oxide, oxacyclobutane, 3,3-bis(chloromethyl)-oxacyclobutane, 3,3-bis(cyano-methyl)-oxacyclobutane, 3,3-dimethyl-oxacyclobutane and tetrahydrofurane.

The polyethers used in accordance with the invention contain a maximum of 95% by weight and a minimum of 5% by weight of each of their components. Preferably those polymers are used which contain from 30 to 95% by weight of tetrahydrofurane from 0 to 60% by weight of ethylene oxide and from 0 to 40% by weight of b 3,3-bis(chloromethyl)-oxacyclobutane.

According to the nature of the monomers the polyethers are obtained either by cationic or anionic polymerization. The average molecular weight (numerical average) of the polyethers amounts to at least 500 and is preferably between 3,000 and 100,000; the increase in molecular weight is, on the one hand, only limited by the practical difficulty in obtaining a higher molecular weight and, on the other hand, by the fact that generally the solubility of the polyethers in molten trioxane decreases with increasing molecular weight. Products of particularly high molecular weight may, for example, be obtained by polymerization in bulk of the above-mentioned cyclic ethers in the presence of catalysts such as triphenylmethylhexafluorophosphate, triphenylmethylhexafluoroarsenate or triphenylmethylhexafluoroantimonate or phosphorus pentafluoride (cf. for example German Offenlegungsschrift 1,570,628). The solubility can also be influenced by appropriate qualitative and quantitative combinations of the monomeric ethers: thus polymers with bigger portions of oxyethylene units usually show improved solubility. The same measure also permits varying the tendency towards crystallization as well as the glass temperature of the polyethers within broad limits; preferably those polyethers are used for polymerization with trioxane which show no or very little tendency towards crystallization at glass temperatures of below − 20°C, preferably even below − 50°C.

When producing polymers consisting only of oxymethylene units and polyether segments it is necessary to chemically stabilize the terminal hydroxyl groups of the polymers against thermal degradation, e.g. by esterification or etherification.

For the production of polymers containing oxyalkylene units besides the oxymethylene units and the polyether segments those compounds are used which are known to be copolymerized with trioxane. (By oxyalkylene units we understand bivalent linear aliphatic radicals which may possibly carry as substituent a lower alkyl radical or a lower halogeno-alkyl radical, an alkoxymethyl radical having from 2 to 6, preferably from 2 to 4 carbon atoms or a phenoxymethyl radical).

Suitable comonomers for trioxane are principally cyclic ethers having from 3 to 5, preferably 3 ring members, cyclic acetals other than trioxane having from 5 to 11, preferably from 5 to 8 ring members, and linear polyacetals, each in amounts of from 0.1 to 20% by weight, preferably from 0.5 to 10% by weight.

As cyclic ethers and cyclic acetals compounds of the formula (III)

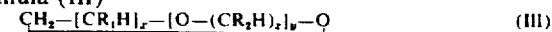   (III)

are used in which formula
R$_1$ and R$_2$ are the same or different, each represents
 a hydrogen atom, a lower alkyl radical, optionally containing from 1 to 3 halogen atoms, preferably chlorine atoms, or a phenyl radical,
and $x$ is an integer of from 1 to 3 and $y$ is zero,
or $x$ is zero, $y$ is an integer of from 1 to 3 and $z$ is 2,
or $x$ is zero, $y$ is 1 and $z$ is an integer of from 3 to 6, preferably 3 or 4,
or
R$_1$ means an alkoxymethyl radical having from 2 to 6, preferably from 2 to 4 carbon atoms or a phenoxymethyl radical, $x$ being 1, $y$ being zero, and R$_2$ being as defined above.

Particularly suitable as cyclic ethers and cyclic acetals are compounds of the formula (IV)

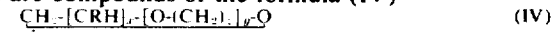   (IV)

wherein
R represents a hydrogen atom, a lower alkyl radical, optionally containing from 1 to 3 halogen atoms, preferably chlorine atoms, or a phenyl radical,
and $x$ is an integer of from 1 to 3 and $y$ is zero,
or $x$ is zero, $y$ is an integer of from 1 to 3 and $z$ is 2,
or $x$ is zero, $y$ is 1 and $z$ is an integer of from 3 to 6, preferably 3 or 4,
or wherein
R represents an alkoxymethyl radical having from 2 to 6, preferably from 2 to 4 carbon atoms, or a phenoxymethyl radical, $x$ being 1 and $y$ being zero.

As cyclic ethers and cyclic acetals are used preferably compounds of formula (V)

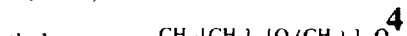   (V)

wherein $x$ is either an integer of from 1 to 3 and $y$ is zero, or $x$ is zero, $y$ is an integer of from 1 to 3 and $z$ is 2, or wherein $x$ is zero, $y$ is 1 and $z$ is an integer of from 3 to 6, preferably 3 or 4.

As cyclic ethers are mainly those suitable containing 3 ring members, e.g. ethylene oxide, styrene oxide, propylene oxide and epichlorohydrin as well as phenylglycidyl ether.

As cyclic acetals are suitable above all cyclic formals of aliphatic or cyclo-aliphatic α, ω-diols having from 2 to 8, preferably from 2 to 4 carbon atoms, the carbon chain of which may be interrupted by an oxygen atom at intervals of 2 carbon atoms, e.g. glycol formal (1,3-dioxolane), butanediol formal (1,3-dioxepane) and diglycol formal (1,3,6-trioxocane) as well as 4-chloromethyl-1,3-dioxolane and hexanediol formal (1,3-dioxonane).

Linear polyacetals are also suitable as copolymerizable component instead of cyclic ethers or cyclic acetals. By linear polyacetals we understand both homo- or copolymers of the cyclic acetals as defined above, as well as linear condensates or aliphatic or cyclo-aliphatic α, ω-diols with aliphatic aldehydes or thio-aldehydes, preferably formaldehyde. Especially used are homopolymers of linear formals of aliphatic α, ω-diols having from 2 to 8, preferably from 2 to 4 carbon atoms, for example poly(dioxolane) and poly(dioxepane).

The reduced specific viscosity (RSV) of the poly(oxymethylenes) of the invention with polyether segments (measured at 140°C in butyrolactone containing 2% by weight of diphenylamine, in a concentration of 0.5 g/100 ml) are from 0.1 to 2.50 dl/g, preferably from 0.2 to 2.0 dl/g.

The melt indices $i_2$ of the poly(oxymethylenes) produced in accordance with the invention range from 0.1 to 30 g/10 minutes, preferably from 0.3 to 20 g/10 minutes, those of $i_{20}$ generally range from 10 to 1000, preferably from 12 to 50.

The melt index $i_2$ is measured according to DIN 53735 at a temperature of 190°C and at a load of 2.16 kg, and the melt index $i_{20}$ at a load of 21.6 kg.

The molding compositions of the invention are characterized particularly by their good working properties and their improved flow, e.g. high ratio of the melt indices $i_{20}/i_2$.

Thus polymers containing trioxane, 2% by weight of dioxolane and varying quantities of poly(ethylene oxide) (cf. table 2) which were obtained after hydrolytic working up in the form of very small particles, had to be filtered and dried carefully. Furthermore, the dried polymers in powder form were somewhat hygroscopic and difficult to extrude in a single screw extruder. Such difficulties did not arise in the processing of the polymers of the invention.

Whilst the melt index ratios $i_{20}/i_2$ of the polymers containing trioxane and 2% by weight of dioxolane or ethylene oxide range approximately from 20 to 30, the polymers of the invention show rising ratios $i_{20}/i_2$ with increasing polyether portions; as little as 2.5 to 5% by weight of the polyether incorporated in accordance with the invention caused an increase in the ratio $i_{20}/i_2$ to about 40 to 50. Consequently, the products prove to have better flow properties under elevated pressure, which makes them particularly suitable for extrusion.

Furthermore, shaped articles made from the compositions according to the invention have improved toughness properties. Especially good results were obtained with polymers consisting of trioxane, 2% by weight of dioxolane and 2.5 respectively 5% by weight of polyether with melt indices $i_{20}$ approximately between 12 and 50 g/minute.

The production of the poly(oxymethylenes) of the invention in principle takes place according to processes known for the polymerization and copolymerization of trioxane, i.e. whilst air and humidity are excluded, the polymer basic material and possibly the co-monomer are dissolved or suspended in molten trioxane by stirring or kneading and the mixture thus obtained is polymerized in the presence of cationic catalysts at temperatures of between 0 and 100°C, preferably between 50° and 90°C (cf. for example German Auslegeschrift No. 1,420,283). As catalysts are used those compounds which are known for the copolymerization of trioxane with cyclic ethers or acetals, especially protonic acids or Lewis acids, e.g. perchloric acid, boron trifluoride, tin tetrachloride, phosphorus pentafluoride, arsenic pentafluoride and antimony pentafluoride, or also their complex compounds or salts, i.e. triphenylmethylhexafluorophosphate, triethyloxonium-tetrafluoro-borate or acetyl perchlorate. It is also possible to work in the presence of inert solvents, for example cyclohexane. The duration of the polymerization and the catalyst quantity to be used depend on the type of the polymerization aggregate, the temperature as well as the type, quantity and purity of the co-monomers and the polymer basic materials. When using boron trifluoride-di-n-butyl etherate as catalyst its concentration is approximately between 20 and 2000 ppm, preferably between 100 and 1000 ppm, calculated on the mixture, and the periods of polymerization are between a few minutes and several hours, preferably between 2 and 30 minutes.

For the removal of unstable portions it is best to subject the poly(oxymethylenes), produced in the presence of comonomers, to a partial controlled thermal or hydrolytic degradation to primary terminal alcohol groups (cf. for example German Auslegeschriften Nos. 1,445,273 and 1,445,294).

It is also possible to achieve the incorporation of the polyethers to be used into the oxymethylene polymers by mixing polyether and poly(oxymethylene), possibly by means of an inert liquid dissolving either one of the components or both and reacting them with one another in the presence of cationic catalysts at temperatures of between 0° and 100°C, preferably between 50° and 90°C. The removal of unstable portions, for example, the stabilization of the terminal hydroxyl groups is achieved as described above.

In order to stabilize the molding composition of the invention against the action of heat, oxygen and light, it is best to mix it with stabilizers and to homogenize it subsequently in the melt. Suitable heat stabilizers are, for example, polyamides, amides of polybasic carboxylic acids, amidines, hydrazines, ureas and poly(N-vinyl-lactams). As oxidation stabilizers phenols, especially bisphenols, and aromatic amines are used and suitable stabilizers against the action of light are derivatives of α-hydroxy-benzophenone and of benzotriazole, the stabilizers being generally used in an amount of from 0.1 to 10% by weight, preferably 0.5 to 5% by weight, calculated on the total mixture.

The molding composition of the invention can be comminuted mechanically, for example by chopping or grinding, into granules, chips, flakes or powders. It can be processed in the thermoplastic state, e.g. by injection molding or extrusion into shaped articles, such as bars, rods, plates, films, ribbons and tubes. The molding composition is particularly suitable as technical material for the manufacture of precision machine parts requiring dimensional stability, for example gear wheels, pulleys and control elements for automatically working machines.

The following examples illustrate the invention

EXAMPLES 1 to 13:

a. The polyethers used as polymerization components are produced as described below:

Aluminum tubes are each filled with 100 g of anhydrous monomer mixture in a layer of 0.8 cm, air and humidity being excluded. After addition and dissolution of about 100 to 150 mg of triphenylmethylhexafluoro-phosphate per tube these are maintained at a temperature of 20° to 25°C by means of an air or water bath. Polymerization starts after an induction period lasting from several minutes to some hours and ends after 24 to 28 hours.

The polyethers obtained show a consistency ranging from a highly viscous to a rubberlike condition. By means of steam distillation or dialysis in cellophane hoses the polyethers are freed from monomer and catalyst residues.

In case of a mixture containing more than 20% by weight of ethylene oxide it is recommended to use thick walled glass ampoules with safety locks and total diameters of no more than 3 cm and as a security measure against explosions.

Polyethers that may be used in accordance with the invention are compiled in Table 1. The composition of the polyethers in per cent was determined by quantitative evaluation of the proton signals of NMR spectra. The reduced specific viscosity (RSV) was measured in a solution of the polymer in benzene in a concentration of 2.5 mg/ml at 30°C. The numerical average of the molecular weight (Mn) was determined by steam pressure osmometry, the glass temperature Tg by differential thermal analysis.

Table 1

| | Composition polyether (% by weight) | | RSV- (dl/g) | $M_n$ | $T_g$ (°C) |
|---|---|---|---|---|---|
| A | poly(ethylene oxide) | — | — | 20,000 | |
| B1 | tetrahydrofurane +ethylene oxide | 90 10 | 1.3 | 8,500 | −88 |
| B2 | tetrahydrofurane +ethylene oxide | 65 35 | — | 3,400 | −82 |
| C | tetrahydrofurane +3,3-bis(chloromethyl)-oxacyclobutane | 80 20 | 10.4 | >15,000 | −77 |
| D1 | tetrahydrofurane +ethylene oxide +3,3-bis(chloromethyl)-oxacyclobutane | 46 21 33 | 3.0 | 9,000 | −84 |
| D2 | tetrahydrofurane +ethylene oxide +3,3-bis(chloromethyl)-oxacyclobutane | 80 10 10 | 5.1 | >10,000 | −81 |
| D3 | tetrahydrofurane +ethylene oxide +3,3-bis(chloromethyl)-oxacyclobutane | 80 10 10 | 1.0 | 5,000 | −80 |
| E | tetrahydrofurane +ethylene oxide +3,3-dimethyl-oxacyclobutane | 85 10 5 | 2.3 | — | −79 |
| F | tetrahydrofurane +ethylene oxide +3,3-bis(cyanomethyl)-oxacyclobutane | 70 23 7 | 1.3 | 6,000 | −85 | b. 100 g of a mixture of molten trioxane, 2% by weight of dioxolane, calculated on the total quantity of the polymerization mixture, and different quantities of polyether which have been refined beforehand by steam distillation or dialysis and have been freed from volatile portions in vacuo at 160°C, are charged in a layer of 0.8 cm under a nitrogen atmosphere, into flat polymerization receptacles and are maintained in a bath at 70°C. After addition of a catalyst the receptacles are agitated; boron trifluoride-di-n-butyl etherate is used as catalyst which is dissolved in cyclohexane at a ratio of 1:20 parts by volume. After an induction period from 1 to 10 minutes the mixture solidifies and is maintained at 70°C during the following 30 minutes. The mixture is then cooled down to 0°C. After this the polymer is pulverized and in order to eliminate thermally unstable portions it is processed for 30 minutes in an autoclave under a nitrogen atmosphere at 155°C in a concentration of 50 g of polymer/1000 ml of a mixture of methanol/water/triethylamine (66:34:0.1 parts by volume). Subsequently the polymer is washed thoroughly with acetone and is dried at 70°C in a nitrogen current.

The polymer thus obtained is mixed with 0.1% by weight of dicyano-diamide and 0.5% by weight of bis(2-hydroxy-3-tert.butyl-5-methyl-phenyl)-methane. The mixture is homogenized at 200°C in a single screw extruder. The residence time in the cylinder of the extruder is about 4 minutes.

The impact flexural strength is measured according to DIN 53 453 by means of test bars with the dimensions 4 × 6 × 50mm which were molded by injection at 220°C.

The individual measured results have been compiled in Table 2.

COMPARATIVE TESTS I AND II

According to Examples 1 to 13 of the invention trioxane is polymerized with dioxolane and different quantities of poly(ethylene oxide) and is processed. From the molding compositions obtained shaped articles are produced, the mechanical properties of which are measured. Table 2 shows the measured results.

tetrahydrofurane, from 0 to 60% by weight of units derived from ethylene oxide and from 0 to 40% by weight of units derived from 3,3-bis(chloromethyl)oxacyclobutane, said polyether segments containing at least 5% by weight of units derived from ethylene oxide or 3,3-bis(chloromethyl)oxacyclobutane.

2. A thermoplastic molding composition comprising poly(oxymethylene) containing from 0.1 to 20% by weight of oxyalkylene groups with 2 to 8 carbon atoms in the principal chain and from 0.1 to 40% by weight of polyether segments having a number average molecular weight (Mn) of at least 500 and at least two different structural units, said polyether segments containing from 30 to 95% by weight of units derived from tetrahydrofurane, from 0 to 60% by weight of units derived from ethylene oxide and from 0 to 40% by weight of units derived from 3,3-bis(chloromethyl)oxacyclobutane, said polyether segments containing at least 5% by weight of units derived from ethylene oxide or 3,3-bis(chloromethyl)oxacyclobutane.

3. A thermoplastic molding composition based on poly(oxymethylene) and containing from 99.8 to 80% by weight of oxymethylene units, from 0.1 to 10% by weight of oxyalkylene units having 2 to 8 carbon atoms and from 0.1 to 10% by weight of polyether segments having a number average molecular weight (Mn) of at least 500 and at least two different structural units, said polyether segments containing from 30 to 95% by weight of units derived from tetrahydrofurane, from 0 to 60% by weight of units derived from ethylene oxide and from 0 to 40% by weight of units derived from 3,3-bis(chloromethyl)oxacyclobutane, said polyether segments containing at least 5% by weight of units derived from ethylene oxide or 3,3-bis(chloromethyl)oxacyclobutane.

4. A composition according to claim 1 wherein said polyether units are derived from tetrahydrofurane and ethylene oxide.

5. A composition according to claim 1 wherein said polyether units are derived from tetrahydrofurane and 3,3-bis(chloromethyl)oxacyclobutane.

6. A composition according to claim 1 wherein said polyether units are derived from tetrahydrofurane, eth- Table 2

| Example | polyether type quantity (% by weight) | catalyst solution (ml) | induction period (min) | Yield (%) | RSV (dl/g) | $i_{20}$ (g/10 min) | $i_2$ (g/10 min) | $i_{20}/i_2$ | impact flexural strength (kg cm/cm²) |
|---|---|---|---|---|---|---|---|---|---|
| I | A | 2.5 | 0.4 | 2.33 | 84 | 0.73 | 244 | 11.6 | 21 | 73 |
| II | A | 3.0 | 0.6 | 3 | 88 | 0.82 | 88.2 | 3.5 | 25 | 109 |
| 1 | B1 | 5.0 | 0.7 | 4 | 79 | 0.98 | 41.5 | 0.9 | 46 | 119 |
| 2 | C | 5.0 | 0.4 | 2 | 73 | 1.04 | 28.6 | 0.7 | 41 | 113 |
| 3 | D1 | 2.5 | 0.3 | 2.25 | 80 | 0.96 | 29.4 | 0.7 | 42 | 166 |
| 4 | D1 | 5.0 | 0.5 | 2.50 | 80 | 1.08 | 18.2 | 0.4 | 46 | 139 |
| 5 | D2 | 2.5 | 0.3 | 2.75 | 88 | 1.24 | 12.4 | 0.3 | 41 | 114 |
| 6 | D2 | 5.0 | 0.4 | 2.50 | 72 | 1.16 | 22.0 | 0.6 | 37 | 147 |
| 7 | D3 | 2.5 | 0.3 | 3 | 94 | 1.16 | 25.6 | 0.6 | 45 | 173 |
| 8 | D3 | 5.0 | 0.4 | 3.75 | 52 | 1.02 | 23.7 | 0.4 | 49 | 173 |
| 9 | B2 | 2.5 | 0.5 | 3 | 80 | 0.87 | 48.4 | 1.2 | 40 | 124 |
| 10 | B2 | 5.0 | 0.8 | 4 | 83 | 0.74 | 54 | 0.9 | 60 | 121 |
| 11 | B2 | 10.0 | 2.0 | 8 | 66 | 0.64 | 60.5 | 0.23 | 270 | 118 |
| 12 | F | 2.5 | 0.6 | 3 | 78 | 1.32 | 16 | 0.3 | 48 | 137 |
| 13 | E | 2.5 | 0.4 | 3 | 84 | 1.04 | 22.3 | 0.6 | 37 | 133 |

What is claimed is:

1. A thermoplastic molding composition comprising poly(oxymethylene) containing from 0.1 to 40% by weight of polyether segments having a number average molecular weight (Mn) of at least 500 and at least two different structural units, said polyether segments containing from 30 to 95% by weight of units derived from ylene oxide and 3,3-bis(chloromethyl)oxacyclobutane.

7. A composition according to claim 2 wherein said oxyalkylene groups are derived from dioxolane.

8. In a process for producing a poly(oxymethylene) containing polyether segments by copolymerizing trioxane and a polyether with a cationic catalyst at a temperature of 0° to 100°C., the improvement which comprises using as the polyether a copolymer of from 30 to 95% by weight of tetrahydrofurane, from 0 to 60% by weight of ethylene oxide and from 0 to 40% by weight of 3,3-bis(chloromethyl)oxacyclobutane, said polyether containing at least 5% by weight of units derived from ethylene oxide or 3,3-bis(chloromethyl)oxacyclobutane.

9. A process according to claim 8 wherein said polyoxymethylene contains from 0.1 to 20% by weight of oxyalkylene groups with 2 to 8 carbon atoms in the principal chain.

* * * * *